(12) United States Patent
Frank et al.

(10) Patent No.: US 10,288,092 B2
(45) Date of Patent: May 14, 2019

(54) COMPRESSED-AIR SUPPLY INSTALLATION, PNEUMATIC SYSTEM, AND METHOD FOR CONTROLLING A COMPRESSED-AIR SUPPLY INSTALLATION

(71) Applicant: WABCO GmbH, Hannover (DE)

(72) Inventors: Dieter Frank, Hannover (DE); Frank Meissner, Hannover (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 34 days.

(21) Appl. No.: 15/321,754

(22) PCT Filed: Jun. 16, 2015

(86) PCT No.: PCT/EP2015/001212
§ 371 (c)(1),
(2) Date: Dec. 23, 2016

(87) PCT Pub. No.: WO2015/197169
PCT Pub. Date: Dec. 30, 2015

(65) Prior Publication Data
US 2017/0152875 A1 Jun. 1, 2017

(30) Foreign Application Priority Data
Jun. 25, 2014 (DE) .......... 10 2014 009 419

(51) Int. Cl.
*F15B 21/00* (2006.01)
*B60G 17/052* (2006.01)
(Continued)

(52) U.S. Cl.
CPC ............ *F15B 21/005* (2013.01); *B60G 11/27* (2013.01); *B60G 11/30* (2013.01);
(Continued)

(58) Field of Classification Search
CPC ...... F15B 21/005; F15B 21/048; B60G 11/27; B60G 17/0523; B60T 17/02
See application file for complete search history.

(56) References Cited

U.S. PATENT DOCUMENTS

| 4,756,548 | A | 7/1988 | Kaltenthaler et al. |
| 6,098,967 | A | 8/2000 | Folchert |

(Continued)

FOREIGN PATENT DOCUMENTS

| DE | 3233545 A1 | 3/1984 |
| DE | 3542974 A1 | 6/1987 |

(Continued)

*Primary Examiner* — Nicole T Verley
(74) *Attorney, Agent, or Firm* — Leydig, Voit & Mayer, Ltd.

(57) ABSTRACT

A compressed air supply installation for operation of an air spring installation of a vehicle includes an air feed with an air compressor configured to supply a compressed air feed with compressed air, a pneumatic main line with an air dryer and a compressed air connection for supplying the pneumatic installation with compressed air, a purge line branching from the pneumatic main line to the compressed air feed and comprising a purge valve connected in the purge line and a purge connection for releasing air to the environment, wherein the purge valve is part of a controllable valve assembly. The controllable valve assembly with the purge valve can be pneumatically loaded with a control pressure derived from the air compressor.

19 Claims, 6 Drawing Sheets

(51) Int. Cl.
 *B60T 17/02* (2006.01)
 *F15B 21/048* (2019.01)
 *F15B 21/041* (2019.01)
 *B60G 11/27* (2006.01)
 *B60G 11/30* (2006.01)

(52) U.S. Cl.
 CPC .......... *B60G 17/0523* (2013.01); *B60T 17/02* (2013.01); *F15B 21/041* (2013.01); *F15B 21/048* (2013.01); *B60G 2202/154* (2013.01); *B60G 2500/02* (2013.01); *B60G 2500/203* (2013.01); *B60G 2500/204* (2013.01); *B60G 2500/205* (2013.01); *B60G 2500/2044* (2013.01); *F15B 2211/41563* (2013.01); *F15B 2211/428* (2013.01); *F15B 2211/8855* (2013.01)

(56) References Cited

U.S. PATENT DOCUMENTS

| | | | | |
|---|---|---|---|---|
| 8,777,246 B2 * | 7/2014 | Meier | ........................ | F17D 1/02 137/487.5 |
| 8,814,190 B2 * | 8/2014 | Becher | ..................... | F04B 7/02 137/487.5 |
| 8,899,598 B2 * | 12/2014 | Frank | .................. | F16K 31/0651 137/565.18 |
| 9,010,785 B2 * | 4/2015 | Gocz | .................. | B60G 17/0523 280/124.16 |
| 9,829,248 B2 * | 11/2017 | Folchert | ............. | B60G 17/0155 |
| 9,926,994 B2 * | 3/2018 | Frank | .................. | B60G 17/0155 |
| 2002/0153688 A1 | 10/2002 | Jurr et al. | | |
| 2013/0062541 A1 | 3/2013 | Diekmeyer et al. | | |
| 2013/0255787 A1 | 10/2013 | Frank et al. | | |
| 2013/0257007 A1 * | 10/2013 | Frank | .................. | B60G 17/0523 280/124.161 |
| 2013/0276899 A1 * | 10/2013 | Frank | .................... | F15B 21/044 137/1 |
| 2017/0036505 A1 * | 2/2017 | Bohn | ................. | B60G 17/0155 |
| 2017/0158018 A1 * | 6/2017 | Ohashi | .............. | B60G 17/0523 |

FOREIGN PATENT DOCUMENTS

| | | | |
|---|---|---|---|
| DE | 3919438 A1 | 12/1990 | |
| DE | 19724747 C1 | 6/1998 | |
| DE | 102010024476 A1 | 12/2011 | |
| DE | 102010054704 A1 * | 6/2012 | ......... B60G 17/0523 |
| DE | 102011053707 A1 | 3/2013 | |
| DE | 102012005305 A1 | 6/2013 | |
| EP | 1165333 B2 | 6/2006 | |
| JP | H 0450020 A | 2/1992 | |
| WO | WO 2012079688 A1 | 6/2012 | |
| WO | WO 2012079691 A1 | 6/2012 | |

* cited by examiner

FIG. 4

COMPRESSED-AIR SUPPLY INSTALLATION, PNEUMATIC SYSTEM, AND METHOD FOR CONTROLLING A COMPRESSED-AIR SUPPLY INSTALLATION

CROSS REFERENCE TO RELATED APPLICATIONS

This application is a U.S. National Stage Application under 35 U.S.C. § 371 of International Application No. PCT/EP2015/001212 filed on Jun. 16, 2015, and claims benefit to German Patent Application No. DE 10 2014 009 419.7 filed on Jun. 25, 2014. The International Application was published in German on Dec. 30, 2015 as WO 2015/197169 A1 under PCT Article 21(2).

FIELD

The invention is directed to a compressed air supply installation, a pneumatic system, and methods for controlling and operating a compressed air supply installation.

BACKGROUND

Compressed air supply installations are used in vehicles of all types, in particular to supply an air spring system of a vehicle with compressed air. Air spring systems may also include ride height adjustment devices with which the distance between the vehicle axle and the vehicle chassis can be adjusted. An air spring installation of a pneumatic system cited initially comprises a number of air bellows pneumatically connected to a common line (gallery) which are able to raise the vehicle chassis when increasingly inflated, and lower it again when the fill level decreases. As the distance between the vehicle axle and vehicle chassis (or the ground clearance) increases, the spring travels become longer and even greater bumps in the ground can be overcome without contact with the vehicle chassis. Such systems are used in off-road vehicles and Sport Utility Vehicles (SUV). In particular in SUVs with very powerful engines, it is desirable to provide the vehicle firstly with comparatively low ground clearance for high speeds on the road, and secondly comparatively large ground clearance for off-road use. It is furthermore desirable to be able to implement a change in ground clearance as quickly as possible, which increases the requirements with regard to speed, flexibility and reliability of a compressed air supply installation.

A compressed air supply installation for use in a pneumatic system with a pneumatic installation, for example an air spring installation described above, is operated with compressed air from a compressed air feed, for example in a pressure level range from 5 to 20 bar. The compressed air is made available to the compressed air feed using an air compressor. The compressed air feed is pneumatically connected to a compressed air connection for supplying the pneumatic installation, and secondly pneumatically connected to a purge connection. The compressed air supply installation may be purged to the purge connection by the release of air via a purge valve assembly.

To ensure long-term operation of the compressed air supply installation, this comprises an air dryer with which the compressed air is dried. This avoids the accumulation of moisture in the pneumatic system, which at comparatively low temperatures can lead to crystallization damaging the valve, and can also lead to undesirable defects in the compressed air supply installation and in the pneumatic installation. An air dryer comprises a drying agent, normally granulate through which the compressed air can flow, so that at comparatively high pressure, the granulate can absorb the moisture contained in the compressed air by adsorption. An air dryer may also be configured as a regenerative air dryer. This may be achieved in that on each purge cycle—at comparatively low pressure—the dried compressed air from the air spring system flows through the granulate in counterflow or in co-flow relative to the filling direction. For this, the purge valve arrangement can be opened. For such a use—also called a pressure-change adsorption—it has proved desirable to configure a compressed air supply installation flexibly and at the same time reliably, in particular to allow a comparatively rapid purge with a pressure change which is nonetheless adequate for regeneration of the air dryer.

DE 35 429 74 A1 by the applicant describes a compressed air supply installation cited initially for a ride height control device for vehicles with air springs, with which, depending on the vehicle load, a predefined distance of the vehicle passenger cell from the vehicle axle can be maintained by filling and evacuating the air springs. The device contains a normally closed magnetic purge valve and a safety valve which can be controlled using the pressure in the air springs. Such a compressed air supply installation can still be improved.

A compressed air supply installation cited initially is also disclosed in EP 1 165 333 B2 in the context of a pneumatic system cited initially with an air spring installation. As well as a main purge line which can be shut off separately, this comprises a high-pressure purge line which has an additional high-pressure purge valve, as well as the main purge valve pneumatically controlled with a control valve in the main purge line, which is connected in parallel to the main purge line. The free flow cross-section of the separate high-pressure purge valve is smaller than that of the main purge valve. Such a compressed air supply installation can still be improved. It has been found that on purging such a compressed air supply installation via the high-pressure purge line, dry air is purged which is not used for regeneration of the drying agent. This equates to an unnecessary waste of dry air, in particular for the case that a flexible, fast and yet reliable actuation of the compressed air supply installation is required which is suitable for the above applications, with correspondingly high actuation rate.

All the above-mentioned solutions with a purge valve assembly in the form of a controllable magnetic valve assembly provide that, in the non-activated state of the magnetic part, the pneumatic part of the magnetic valve assembly is closed, i.e. the solutions provide a normally closed magnetic valve assembly. In particular with regard to the solution disclosed in DE 35 42 974 A1, it has been found that a normally closed magnetic purge valve assembly may be disadvantageous since, frequently, an additional pressure-limiting or safety valve must be provided in order to guarantee a reliable function. Since, in normally closed state, a relay valve of the magnetic valve assembly is closed, in individual cases this can lead to a valve body sticking on the valve seat, and in some cases the switch function of the relay valve of the magnetic valve assembly is not reliably guaranteed.

DE 39 19 438 C2 discloses a compressed air supply installation in which the air dryer can be connected to an outlet to atmosphere via an electrically actuatable valve device. The valve device has an electric control inlet which is connected to an electronic control device via an electric line with an electric control outlet; in non-activated state, the valve device is open. To inflate an air spring, the valve device assumes a switch position in which the connection of the air dryer to the outlet to atmosphere is interrupted.

DE 197 242 747 C1 discloses a ride height control device for vehicles with air springs, wherein a pneumatically controllable directional valve is provided in the pneumatic main line for switching via a control line, with an air control pressure generated by the compressor. The control line may be connected to atmosphere via a further directional valve, so that when the compressor is not running, the directional valve in the pneumatic main line can change from the one switch state which connects the compressor to the air dryer, to the other switch state which connects the air dryer to atmosphere.

SUMMARY

In an embodiment, the present invention provides a compressed air supply installation for operation of an air spring installation of a vehicle. The compressed air supply installation includes an air feed with an air compressor configured to supply a compressed air feed with compressed air, a pneumatic main line with an air dryer and a compressed air connection for supplying the pneumatic installation with compressed air, a purge line branching from the pneumatic main line to the compressed air feed and comprising a purge valve connected in the purge line and a purge connection for releasing air to the environment, wherein the purge valve is part of a controllable valve assembly. The controllable valve assembly with the purge valve can be pneumatically loaded with a control pressure derived from the air compressor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A device and a method which are improved relative to the prior art are described herein. In particular, an alternative solution to the prior art is given which fundamentally avoids the disadvantages associated with a purge valve which is closed in the non-activated state. In particular, a purge and/or drying performance of the compressed air supply installation is improved, wherein the compressed air supply installation nonetheless can be constructed comparatively simply and compactly. In particular, fundamental technical unpredictabilities concerning a magnetic valve assembly are eliminated. In particular, a pneumatic part of a purge valve can function comparatively reliably but nonetheless be activated easily.

A compressed air supply installation for operation of a pneumatic installation is described herein, in particular an air spring installation of a vehicle, comprising: an air feed with an air compressor for supplying a compressed air feed with compressed air, a pneumatic main line with an air dryer and a compressed air connection for supplying the pneumatic installation with compressed air, a purge line, in particular a purge line branching from the pneumatic main line to the compressed air feed and comprising a purge valve connected in the purge line and a purge connection for releasing air to the environment, wherein the purge valve is part of a controllable valve assembly. According to the invention, it is provided that the purge valve can be pneumatically loaded, in particular directly, with a control pressure derived from the air compressor. In particular, it is preferred that the valve assembly with at least the purge valve can be pneumatically loaded, in particular directly, with a control pressure derived from the air compressor.

A pneumatically controllable valve assembly is described herein which can eliminate certain fundamental weaknesses of a magnetic valve assembly. With pneumatically controllable valve assemblies, fundamental susceptibilities to electrical interference or cable break, contact problems or similar can be avoided; in particular, a valve assembly which can be pneumatically controlled consumes no current. In particular, a valve assembly which can be pneumatically controlled and which comprises a purge valve is described herein. In addition, a control pressure for pneumatically controlled loading of the valve assembly can be derived comparatively easily as a control pressure from an air compressor. Particularly preferably, the control pressure can be derived from an air compressor.

With the pneumatic control concept, not only are electrical control lines omitted but, because the control pressure is derived directly from the air compressor, pneumatic control lines for loading the valve assembly are kept relatively simple. The concept of the invention can be implemented with a comparatively simple construction and directly connected to the air compressor. As a whole, a reduced component complexity and cost are achieved in comparison with previously known solutions, and there is also a reduced risk of failure; also, there is an improved use of installation space for the compressed air supply installation. Because of the comparatively simple design, the compressed air supply installation and control method have an efficient and energy-saving concept which can be implemented with increased functional reliability.

A compressed air supply installation results with a dryer circuit which allows a self-sealing air dryer outlet, wherein a purge magnet can be omitted. The functionality of the valve assembly self-sealing the air dryer outlet results from operation of the air compressor. According to the invention, the following are provided: opening of the purge valve in non-activated state of the valve assembly; closure of the purge valve by pneumatic loading of the valve assembly with a control pressure derived, in particular directly, from the air compressor. Expressed more concisely, a compressor-controlled purge functionality is implemented.

A method is described herein in which, to open the purge valve, a check valve, in particular a check valve arranged in the control line and/or an outlet valve of the compressor, is formed statically open such that when the compressor is not in operation, a control line is purged in the blocking direction of the check valve.

As described herein, additionally or alternatively, to close the purge valve, a check valve and/or outlet valve, in particular a check valve arranged in the control line and/or an outlet valve of the compressor, is dynamically closed such that when the compressor is in operation, a control pressure is maintained, in particular a control pressure must be maintained.

In an embodiment, in the non-activated state of the valve assembly i.e. without loading with control pressure, the purge valve is opened. In the context of a further preferred refinement, in non-activated state of the valve assembly, i.e. without loading with control pressure, the purge valve is closed. Permanently closed valves may be problematical if e.g. a valve piston has a tendency to seize or freezes onto the valve seat, but in principle these are also possible. Such susceptibilities are however in principle avoided with a purge valve which is open when the valve assembly is in the control state without control loading; the particularly preferred refinement cited above is however to be preferred in this respect.

In an embodiment, the purge valve is closed when the air compressor is in operation, and the purge valve is opened when the air compressor is not in operation. In other words, on operation of the air compressor, the air dryer outlet—because of the control pressure directly derived in operation—is closed automatically by closure of the purge valve. Conversely, when the compressor is not in operation and hence the valve assembly is in non-activated state, the purge valve is opened, e.g. under spring pressure of a valve spring, and the air dryer of the pneumatic main line and any pneumatic installation connected to the compressed air supply installation can be purged completely.

Preferably, the purge valve can be activated pneumatically with a control pressure derived directly from the air compressor, and in non-activated state of the purge valve, the purge valve is open. The refinement advantageously provides that the control pressure provided to load the valve assembly is used as a control pressure to activate the purge valve. Preferably, the control pressure is present at a control pressure connection of the purge valve.

In particular, it is proved advantageous that a pneumatic part of the purge valve is formed as a 2/2-way directional valve. In the context of a particularly preferred concrete refinement of the concept, a pneumatically activatable 2/2-way directional valve is provided as a purge valve which is open when not loaded with control pressure. Thus a gallery pressure can pass on purging. On start-up of a compressor of the air compressor, the purge valve (preferably in the form of a 2/2-way directional valve) is closed. In principle, any other purge valve suitable for direct switching of a compressed air volume may be provided insofar as this can be activated pneumatically as part of the valve assembly with a control pressure derived directly from the air compressor.

The purge valve is configured in particular for direct switching of a compressed air volume; preferably, according to a particularly preferred refinement, in a purge line it has a pressure-side valve connection and a purge-side valve connection, and a pressure control connection directly connected to a control line.

To obtain the control pressure directly derived from the air compressor, it has proved advantageous for a control line to be connected directly to a compressor chamber of the air compressor, in particular a compressor itself. The air compressor preferably comprises a compressor, for example a single-stage or two-stage compressor which comprises a compressor chamber.

In the context of a particularly preferred refinement, a control line is routed from a compressor chamber of an air compressor to a pressure control connection of a purge valve in the form of a 2/2-way directional valve, wherein when the pressure control connection is in the state not loaded with control pressure, the purge valve is open.

The valve assembly is furthermore preferably configured to allow automatic closure of the air dryer outlet on a filling function, and automatic opening of the air dryer outlet for purging of the air dryer, and preferably purging of the control line.

In the context of a particularly preferred refinement, the valve assembly comprises, in addition to the purge valve, a counter-valve with a check valve function and/or a choke. Preferably, the purge valve is connected in the purge line. The counter-valve with check function is preferably connected in a parallel line to a bypass line. The bypass line preferably comprises the choke.

In the context of a particularly preferred first variant of a refinement, the counter-valve with check function is formed as a check valve. The check valve has an opening direction for automatic pressure-loaded opening, and a blocking direction. Preferably, the check valve is formed as a shutter check valve.

In the context of a first derivative, a check valve of the valve assembly may be arranged in the control line. In particular, an arrangement of the check valve between a compressor chamber of the air compressor and a pressure control connection of the purge valve has proved advantageous. This structure is comparatively reliable and allows a defined functionality of the check valve in addition to an outlet valve of an air compressor. Advantageously, the pressure control connection of the purge valve can be loaded with control pressure in the automatic opening direction of the check valve. On pressurization of a control line via the air compressor, preferably first a check valve opens automatically in the opening direction to the pressure control connection of the purge valve.

In the context of a second variant, a compressor chamber of a compressor of the air compressor may have an outlet valve (preferably in a pneumatic feed line to the compressed air feed), in some cases, additionally or alternatively, also a connection valve (preferably in a pneumatic control line to the control connection of the purge valve) which performs the function of a counter-valve with check function of the compressor assembly, in particular alternatively to the check valve of the compressor arrangement. This derivative has the advantage that the outlet valve and/or connection valve may be used in synergy not only as such for release of a compressed air volume for the compressed air feed, but it can also perform the function of a check valve between the compressor chamber of the air compressor and the pressure control connection of the purge valve. The purge valve is preferably configured as a purely mechanical blocking valve.

In addition or alternatively to each of the derivatives above, it has proved advantageous to arrange a further counter-valve with check function, in particular a further first check valve, in a pneumatic feed line between a compressor chamber of a compressor and the compressed air connection of the pneumatic main line. In particular, the further counter-valve with check function, in particular the further check valve and/or an outlet valve, from the air compressor opens automatically in the direction of the compressed air connection. This further derivative has proved comparatively simple in construction, in particular if the further first check valve replaces the above-mentioned first check valve of the first derivative. In the latter case in particular, it has proved advantageous if a control line has no check valve.

In the context of a further derivative, the control line may branch between a compressor chamber of a compressor and the further check valve. This advantageously allows connection of the control line to the air compressor and the pneumatic feed line to the compressed air feed. In particular, the control line may be connected directly to the compressor chamber and/or directly to the pneumatic feed line to the compressed air feed.

Preferably, according to an embodiment and in particular according to the above-mentioned refinements, when the valve assembly is in activated state, it can be achieved that the compressor is in operation in order to generate a control pressure for the pressure control connection. Preferably, the control pressure is sufficient for automatic opening of a check valve against its blocking direction. Conversely, it has proved advantageous that, when the compressor is not in operation, the control line can be purged in the blocking direction of the check valve. In particular, for this a check valve has proved suitable which—in brief—is sealed dynamically and unsealed statically. In structural terms, a check valve can preferably be implemented as a shutter check valve with defined static leakage.

In particular, in a first derivative for implementing the purge function, it has proved advantageous that a purge choke is arranged in a first bypass line bypassing the check valve, through which air can flow preferably at least in the blocking direction of the check valve, in particular bidirectionally. In principle, a first bypass line having a purge choke may also be implemented in a second derivative, for example as a parallel line to the control line or as a parallel line to an above-mentioned pneumatic feed line between the compressor and the compressed air connection. The first bypass line having the purge choke may, additionally or alternatively in a third derivative, also be formed as a parallel line to a compressor chamber of a compressor, in particular as a parallel line to an outlet valve of a compressor chamber of a compressor. The first bypass line having the purge choke may, additionally or alternatively in a fourth derivative, also be formed as a parallel line to an outlet valve of a compressor chamber of a compressor, preferably connected to a feed line at least on one side, in particular on both sides. The above-mentioned four derivatives and further derivatives, not listed here, of a first bypass line with purge choke may be implemented individually or in combination.

In addition, a preferred arrangement of a first choke in the pneumatic main line and/or a second choke in the purge line has proved advantageous for the efficient purging and for dryer regeneration. Preferably, the valve assembly furthermore provides a counter-valve with check function connected in parallel to the bypass line. Preferably, a further choke is arranged in a bypass line bypassing a counter-valve with check function, through which line air can flow in the blocking direction of the counter-valve with check function, in particular bidirectionally. In particular, a check valve and/or an outlet valve and/or a connection valve—in particular a check valve arranged in the control line and/or an outlet valve and/or a connection valve of the compressor—may be formed statically open such that when the compressor is not in operation, the control line can be purged in the blocking direction of the check valve. In particular, a dynamically closed functionality of the valve assembly comprises the first check valve and the first bypass line, in particular with a further choke, such that a control pressure is maintained when the compressor is in operation; the control pressure is sufficient, even when air flows through the purge valve in the blocking direction of the check valve, for automatic opening of the first check valve against its blocking direction.

Figure 1A:
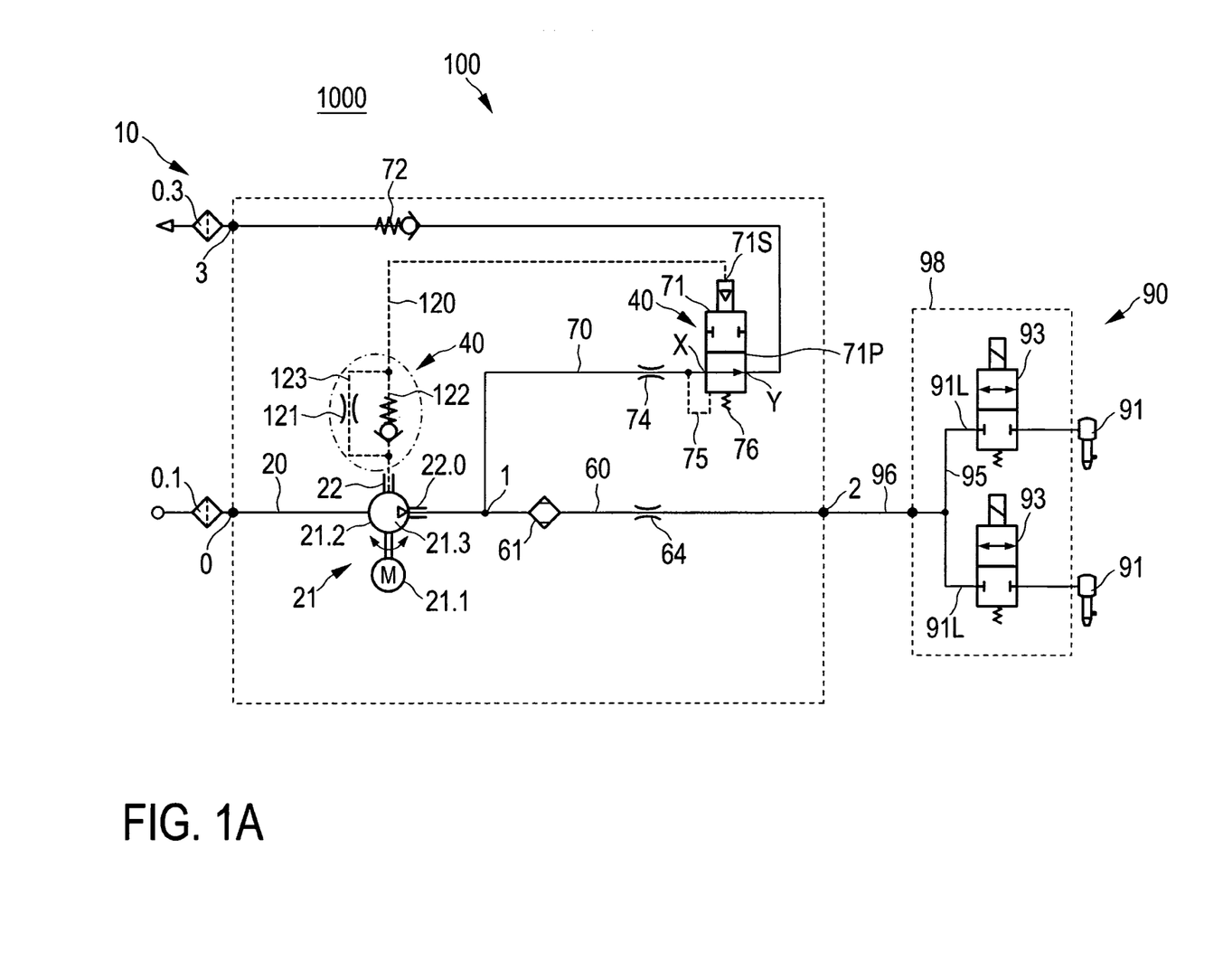
FIG. 1A a circuit diagram of a first embodiment of a compressed air supply installation with a normally open purge valve.

FIG. 1A shows a pneumatic system 100 with a compressed air supply installation 10 and a pneumatic installation 90, which in the present case takes the form of an air spring system for a vehicle chassis (not shown in detail) of a vehicle 1000. The pneumatic installation 90 in the present case is shown partially in relation to an air springing system provided for an axle of the vehicle chassis. This has two bellows 91 which can be filled with compressed air or from which compressed air can be released, depending on the control requirements, for the air springing or ride height control. For this, the bellows 91 are connected to a gallery 95, namely here via bellows lines 91L departing from the gallery 95 as branch lines. The bellows lines 91L branch from the gallery 95, wherein each bellows line 91L has a bellows valve 93 in the form of a directional valve. The two bellows valves 93 provided for an axle in the present case are combined in a double valve block 98 as one component. The compressed air content of the bellows 91 can be modified in controlled fashion by opening or closing one of the bellows valves 93. Compressed air can be supplied to or extracted from the gallery 95 via a pneumatic line 96 which is connected to a compressed air connection 2 of the compressed air supply installation 10.

The compressed air supply installation 10 serves to operate the pneumatic installation 90, i.e. the pneumatic installation 90 is supplied with compressed air by the compressed air connection 2, and the pneumatic installation 90 can be purged by the compressed air connection 2.

To generate compressed air, the compressed air supply installation 10 provides an air feed which has an air feed connection 0 and an air filter 0.1. A pneumatic feed line 20 of the air feed may supply air, received via the air feed connection 0, to an air compressor 21. The air compressor 21 in the present case has a single-stage compressor 21.2 driven via a motor 21.1. The compressor 21.2 in the present case has a single compressor stage with a compressor chamber 21.3, to which firstly the pneumatic feed line 20 of the air feed running on to the compressed air feed 1, and also a pneumatic control line 120, are connected via an outlet valve 22.0.

A pneumatic main line 60 is connected to the compressed air feed 1 and connects the compressor feed 1 to the compressed air connection 2. An air dryer 61 and a first choke 64 are connected to the pneumatic main line 60 in said order from the compressed air feed 1 in the direction of the compressed air connection 2, i.e. in a filling direction.

A purge line 70 branches from the compressed air feed 1, in which line firstly a second choke 74 and, following this in the direction of a purge connection 3, i.e. in the purge direction, a purge valve 71 with a normally open valve piston of a pneumatic part 71P, are connected. For this, the pneumatically actuatable pneumatic part 71P of the purge valve 71 has a pressure-side valve connection X and a purge-side valve connection Y, to which the purge line 70 is connected on a pressure side with the second choke 74, or on a purge side with a purge filter 0.3. The purge valve 71 also has a pressure control connection 71S which can be loaded with control pressure via the above-mentioned control line 120. In the state of the pressure control connection 71S not loaded with control pressure, the purge valve in the first switch state shown in FIG. 1A is open between the valve connections X, Y, i.e. the purge line 70 is open from the compressed air feed 1 to the purge connection 3, so that an air dryer outlet (not shown in detail) of the air dryer 61 is open to the purge connection 3.

In the present case, between the purge-side valve connection Y and the purge filter 0.3, a purge check valve 72 is arranged in the purge line 70 which serves to protect against ingress into the purge line 70 and to retain the pressure or limit the retention pressure on purging. The purge check valve 72 is optional and may if necessary also be omitted insofar as a small pressure difference should not persist on purging. This function of a check valve 72 may suitably be integrated in the minimum pressure valve assembly 130, with omission of the latter, e.g. instead of the minimum pressure valve 132, a check valve is provided similar to the check valve 72, whereby the regeneration of the air dryer 61 is also advantageously influenced without needing to restrict the nominal width of the first choke 134.

The mechanical purge valve 71 presented above, on application of a control pressure to the pressure control connection 71S, can switch to a second switch position in which the pressure-side valve connection X and the purge-side valve connection Y in the purge line 70 are pneumatically separated. The second switch position to this extent serves for operation of the compressed air supply installation 10 for filling the pneumatic installation 90 from the air compressor 21, i.e. from the compressed air feed via the pneumatic main line 60 to the compressed air connection 2. In contrast, the first switch position of the purge valve 71 shown in FIG. 1A, in the state not loaded with control pressure, serves for purging the compressed air supply installation 10 or pneumatic installation 90 via the air dryer 61.

Figure 1B:
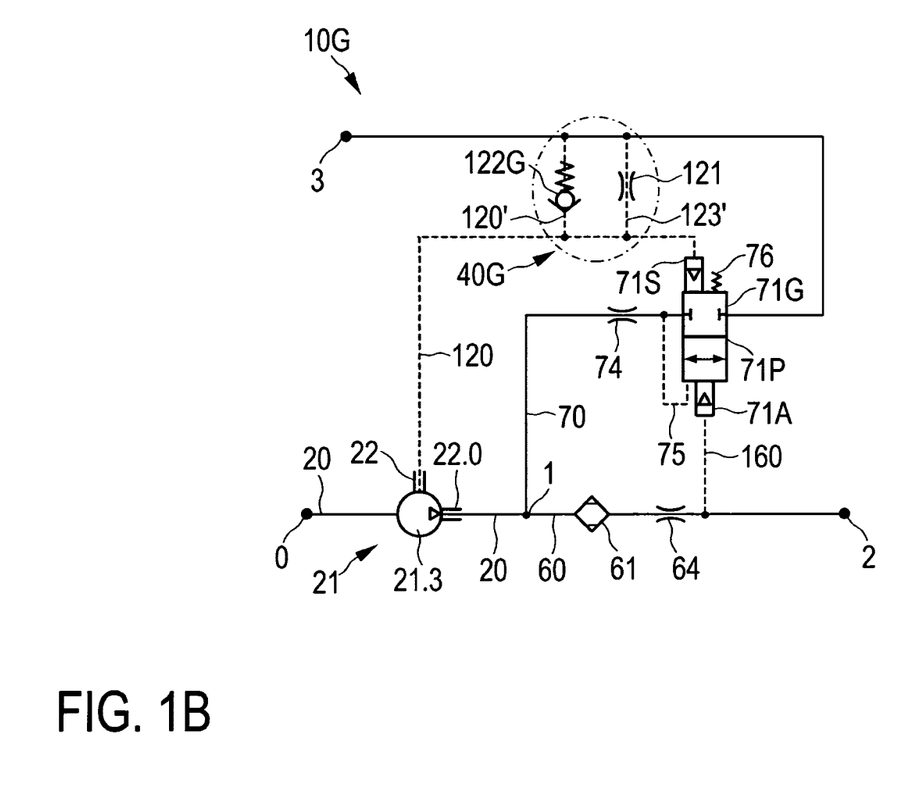
FIG. 1B an extract of the circuit diagrams for a refined embodiment of a compressed air supply installation according to a variant with a normally closed purge valve.

The extract in FIG. 1B from a derived compressed air supply installation 10G shows a derived embodiment with a normally closed purge valve 71G in the purge line 70, forming a closed valve assembly 40G according to a variant; this serves to implement a self-reinforcing closing functionality. Otherwise, for the same or similar parts, or components of the same or similar function, the same reference numerals are used and reference is made to the corresponding parts of the description. In particular, the drawing shows with dotted lines—merely for the sake of clarity—an advantageous control line or branch line 120, 120' and bypass line 123, 123'; the same applies to connected lines of similar or comparable function.

The normally closed purge valve 71G always holds the normally closed valve piston of the pneumatic part 71P closed with a relatively weak valve spring 76. In other words, FIG. 1B shows the normally closed purge valve 71G in which the valve spring 76 merely overcomes friction to create a defined starting position. In operation, the pneumatic force on the back of the piston—more generally, the side of the pneumatic part 71P on the side of the pressure control connection 71S—is greater than on the underside of the piston (e.g. in an annular chamber) on the side of the pressure counter-control connection 71A. The pressure counter-control connection 71A is connected to the counter-pressure control line 160 which branches from the pneumatic main line 60 as a branch line. The purge valve 71 in this embodiment thus remains closed on filling. When the air compressor 21 stops, the air holding the piston closed under the pressure force on the pressure control connection 71S escapes via the choke 121 until the dryer interior pressure brings the piston (more generally, the pneumatic part 71P) of the purge valve 71—and hence the purge valve 71—into the open purge position. When the pressure has diminished, the valve spring 76 restores everything to the unactuated starting position as shown in FIG. 1B. The check valve 122G here serves to limit pressure, a function which would otherwise have to be guaranteed by the relay piston of the pneumatic part 71P.

In both the embodiment shown in FIG. 1A and that in FIG. 1B, on start-up of the air compressor 21 and hence on rising pressure and control pressure in the control line 120, the bypass line 123, 123' acts to reinforce the seal of the valve piston. On sufficiently high pressure in the bypass line 123, 123', however, a further pressure rise from opening of the check valve 122 in the control line 120 (FIG. 1A) or the check valve 122G in the branch line 120' of the control line 120 (FIG. 1B) to the purge connection 3, is prevented. Then only the dryer interior pressure rises, as symbolized this case via the dryer interior pressure line 75, until the area-dependent state of equilibrium is achieved or overcome; thus a pressure limitation is active. After the compressor has stopped, the statically unsealed bypass line 123, 123' reduces the pressure and the valve piston of the pneumatic part 71P is raised against the weak spring force of the valve spring 76 by the dryer interior pressure—present in the dryer interior pressure line 75—and purged in accordance with FIG. 1B. In a derived embodiment, instead of or in addition to the leakage of the bypass line 123, 123', a small magnet may also be used to make the purge system statically unsealed at the purge valve 71G. Thus high pressures can be handled with relatively small spring forces, and the elastomer seals are only loaded lightly in rest state.

In principle, the variant shown in FIG. 1B of a compressed air supply installation 10G may be used to implement a self-reinforcing closing functionality, i.e. with a normally closed purge valve 71G in the purge line 70, with the pneumatic components described, in particular the check valve 122G and the purge choke 121 of the valve assembly 40G—also in the embodiments described as variants below with reference to FIG. 2 and FIG. 3A and FIG. 3B.

Further additionally, with reference to FIG. 1A and FIG. 1B, in order to implement a purely pneumatic activation of the purge valve 71, 71G according to a concept of a compressor-controlled purge functionality, the purge valve 71, 71G may be part of a valve assembly 40, 40G which, in addition to the purge valve 71, 71G, also comprises a check valve 122 arranged in the control line 120 (as shown in FIG. 1A), which is also called the first check valve 122.

The check valve 122, formed in the present case according to FIG. 1A for example as a shutter check valve, is dynamically sealed and statically unsealed. To create the static leakage, a first bypass line 123 to the control line 120 is formed which bypasses the first check valve 122, and in which a bidirectional purge choke 121 is arranged, through which air can flow in particular in the blocking direction of the first check valve 122. A control pressure present at the pressure control connection 71S can thus be purged in the blocking direction of the first check valve 122 via the purge choke 121 and the first bypass line 123. A purge flow of the control pressure may for example escape into the compressor chamber 21.3 of the compressor 21.2. The purge flow may be guided to the environment in the direction of the filter 0.1 and the air feed connection 0. The purge flow of the control pressure may, additionally or alternatively, also be guided by the compressed air feed 1 into the purge line 70 to the purge connection 3. This applies in particular if the pressure in the bypass line 123 is so low that the air dryer 61 is already open or opened via the spring force at the valve piston of the purge valve 71. In the manner described here or in a similar manner, a residual purge of the bypass line 123 can take place.

Secondly, the first check valve 122 in the present case is dynamically closed such that, on operation of the compressor 21.2—despite the purge valve 121 with bidirectional air flow—a control pressure is maintained at the pressure control connection 71S. In other words, on operation of the compressor 21.2, a sufficient control pressure is built up for automatic opening of the check valve 122 against its blocking direction, and applied to the pressure control connection 71S; this takes place even when air flows through the purge choke 121 against the blocking direction of the check valve 122.

Individually, the pneumatic control function of the purge valve 71 takes place as follows. In non-activated state of the valve assembly 40, i.e. without pressure-loading of the valve assembly 40, the pressure control connection 71S of the purge valve 71 is not loaded with control pressure; the purge valve 71 is then in the first switch state shown in FIG. 1A, i.e. open, in which the purge line 70 is open between the pressure-side valve connection X and the purge-side valve connection Y through to the purge connection 3. An air dryer 61 or gallery 95 or the bellows 91 of a pneumatic installation can be purged as soon as one of the bellows valves 93 opens. A purge flow can escape from the bellows 91 via a bellows valve 93 into the gallery 95 and the pneumatic line 96 and the main pneumatic line 60, with regeneration of the air dryer 61, into the purge line 70 and the purge valve 71 to the purge connection 3, to the environment.

As soon as the bellows 91 of the pneumatic installation 90 is filled, the air compressor 21 begins operation; for this, the electric motor 21.1 drives the compressor 21.2 which provides compressed air at a compressed air feed 1 via the outlet valve 22.0. A corresponding pressure is also present in the control line 120 and opens the first check valve 122 in the automatic opening direction. The first check valve 122 is dynamically closed on operation of the compressor 21.2 because of the configuration with the bypass line 123 and the choke 121. In other words, operation of the compressor 21.2 is sufficient to build up a pressure in the compressor chamber 21.3 which is sufficient for a control pressure to be present at the control pressure connection 71S. The control pressure is sufficiently high to transfer the actuatable pneumatic part 71P of the purge valve 71 from the first switch position shown in FIG. 1A to a second switch position, in which the pressure-side valve connection X and the purge-side valve connection Y are pneumatically separated; i.e. the purge line 70 is closed. In this way, the purge line 70 is pneumatically interrupted by the purge valve 71, i.e. the dryer outlet of the air compressor 61 or the compressed air feed 1 is pneumatically separated from the purge connection 3. Thus sufficient compressed air—dried in the air dryer 61—can be provided via the compressed air feed 1 and via the first choke 64 at the compressed air connection to fill the pneumatic installation 90.

Figure 2:
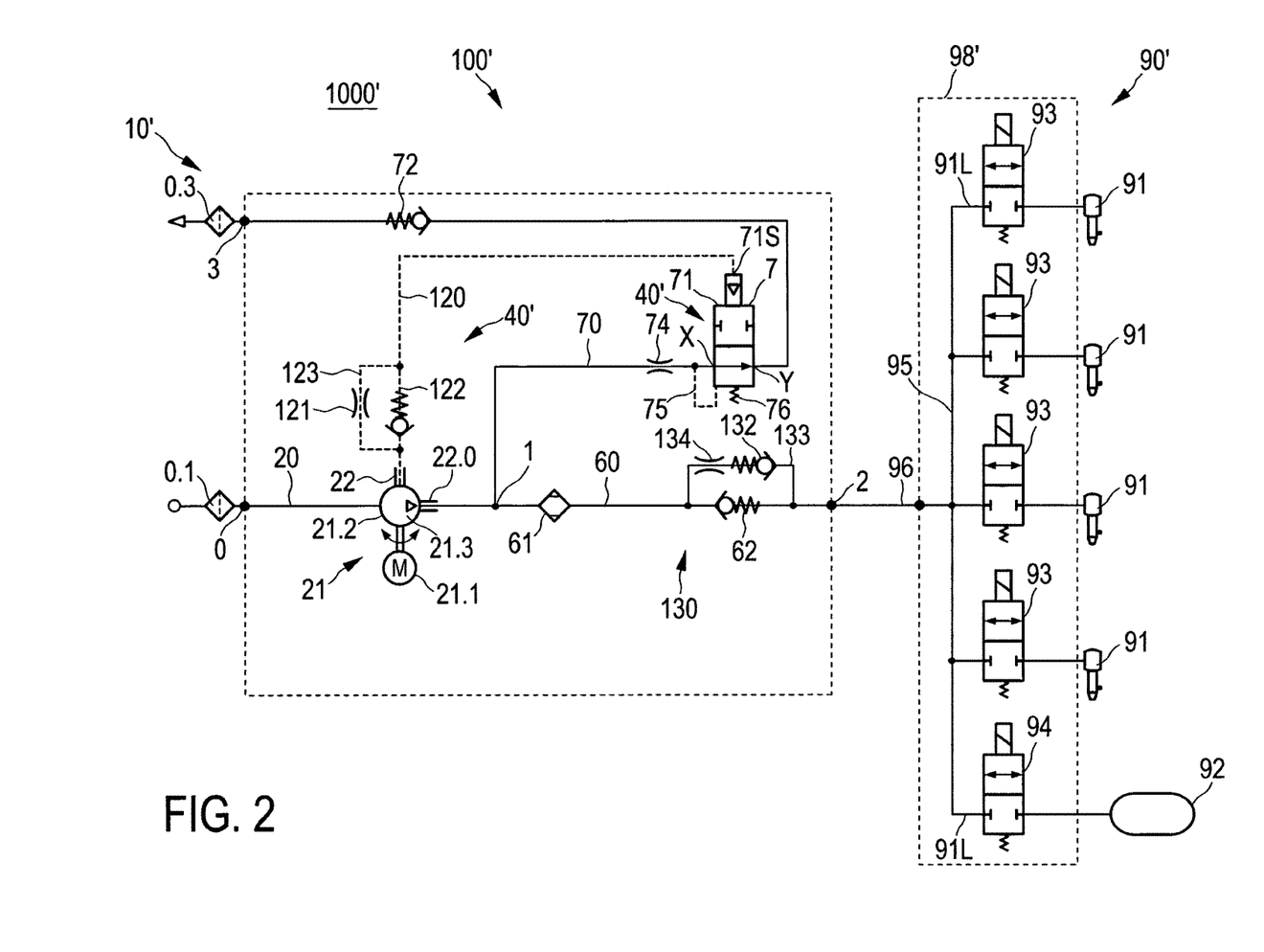
FIG. 2 a further circuit diagram of a refined embodiment of FIG. 1.

FIG. 2 shows a further embodiment of a compressed air supply installation 10' in which the first choke 64 is replaced or modified by a minimum pressure valve assembly 130. Otherwise, for the sake of simplicity, the same reference numerals are used for the same or similar parts of the pneumatic system 100' and the compressed air supply installation 10' and the pneumatic installation 90', or for parts of identical or similar function. With regard to these features, for the description of FIG. 2, reference is made to the corresponding parts of the description of FIG. 1A.

With regard to the pneumatic installation 90', here—as well as four bellows 91—a pressure accumulator 92 is provided, upstream of which an accumulator valve 94 in the form of a directional valve is connected in an accumulator line 92L branching as a branch line from the gallery 95. The bellows valves 93 and the accumulator valve 94 in the present case are combined in a quintuple valve block 98'.

The minimum pressure valve assembly 130 provides a check valve 62 connected in the pneumatic main line 60 and also called a second check valve, which is bypassed by means of a second bypass line 133, i.e. the second bypass line 133 connects to the pneumatic main line 60 on the pressure side between the air dryer 61 and check valve 62, and on the air connection side between the check valve 62 and the compressed air connection 2. A minimum pressure valve 132 and a first choke 134—through which air can flow only in one direction because of the minimum pressure valve 132—are arranged In the second bypass line 133. The minimum pressure valve 132 opens in the blocking direction of the check valve 62. A compressed air connection 2 can be loaded with compressed air from a compressed air feed 1 against the blocking direction of the second check valve 62—i.e. automatically opening—e.g. for filling a gallery 95. In other words, because of the minimum pressure valve assembly 130, when the pneumatic installation 90' is filled by means of the automatically opening second check valve 62, under the delivery pressure of the compressor 21.2, the full line cross-section of the pneumatic main line 60 is opened. On purging however, after overcoming a minimum pressure (depending on the configuration of the minimum pressure valve 132), the first choke 134 is active. To purge the pneumatic installation 90', a purge flow of compressed air can escape via the minimum pressure valve 132 and the first choke 134. A purge flow is used to regenerate the air dryer 61 and is guided further into the purge line 70 via the second choke 74 and the purge valve 71 to the purge connection 3.

In all embodiments shown here of a pneumatic system—in particular both in the embodiment shown in FIG. 2 of a pneumatic system 100' with a compressed air supply installation 10' and a pneumatic installation 90', and also in an embodiment explained below of a pneumatic system 100" with a compressed air supply installation 10" and a pneumatic installation 90"—an accumulator 92 in one or more bellows 91 can be refilled; however, in particular in the embodiments shown in FIG. 2 and FIG. 3A, this only works advantageously if the compressor 21.2 has first been started and a minimum pressure built up which closes the purge, i.e. the purge line 70 is closed by pneumatic activation of the purge valve 71 via the pneumatic control line. In comparison with a "mechanical" blocking of the gallery 95 implemented directly in the pneumatic main line 60 by a blocking valve, this procedure requires slightly more energy since, instead, a "pneumatic blocking" of the gallery is simulated; the procedure however prevents an air loss and makes refilling possible.

Figure 3A:
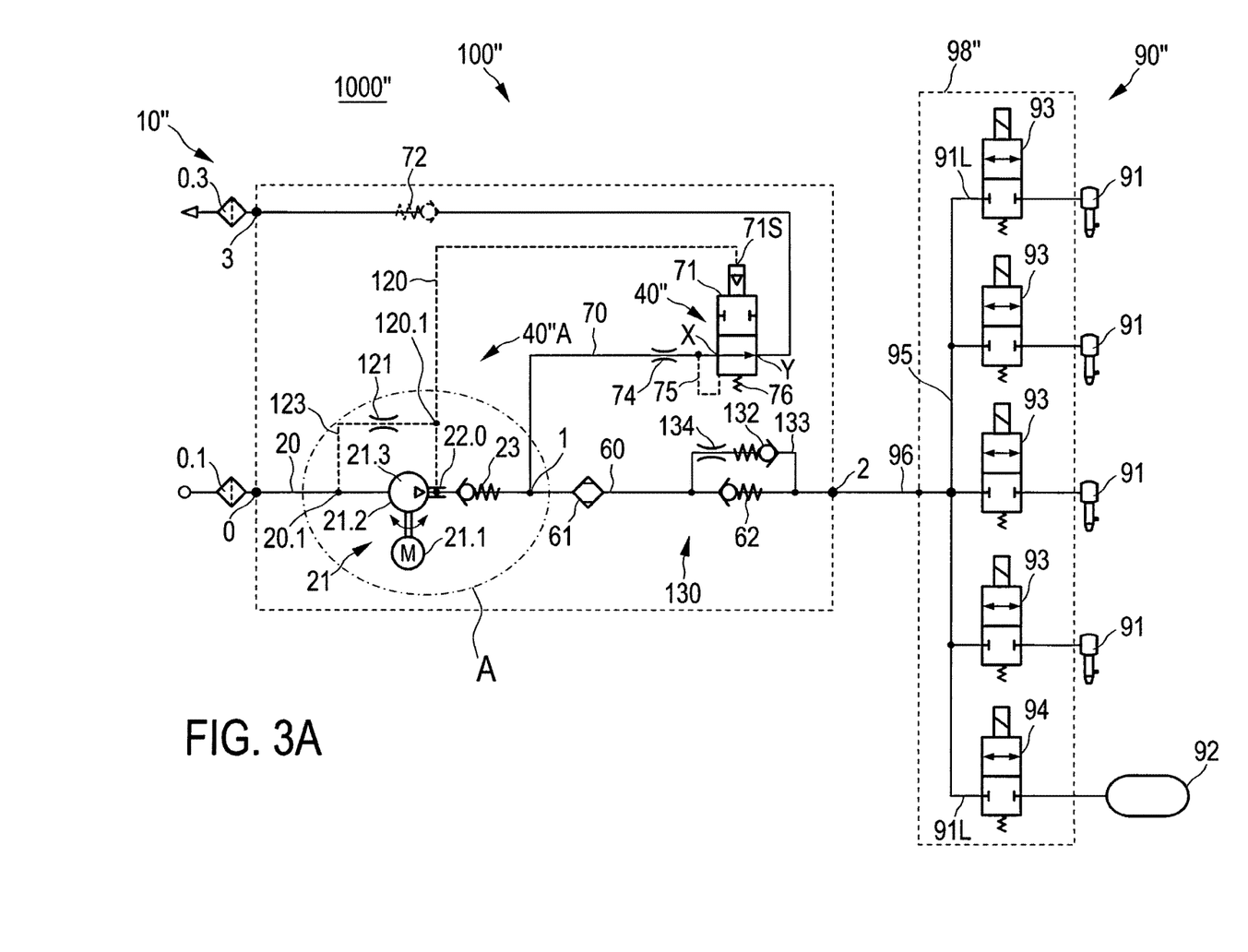
FIG. 3A, FIG. 3B partial circuit diagrams for further embodiments derived from the refined embodiment depicted in FIG. 2.
Figure 3B:
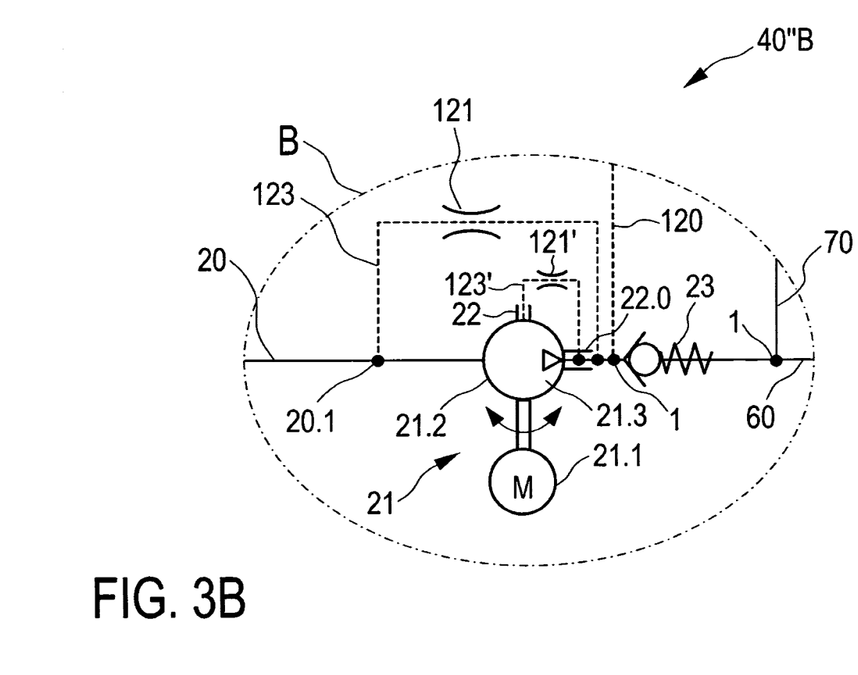

FIG. 3A and FIG. 3B show further embodiments of a modified compressed air supply system 10" in detail A and detail B respectively, for a pneumatic system 100" with a pneumatic installation 90" of a vehicle 1000". In the present case, for the sake of simplicity, the same reference numerals are used for identical or similar features, or features of identical or similar function. For a description of the corresponding parts of FIG. 3A and FIG. 3B, reference is made to the description of FIG. 2 and the description of FIG. 1A. Detail A and detail B of FIG. 3A and FIG. 3B are described more extensively below.

Detail A of FIG. 3A shows a derived embodiment of a valve assembly 40" with correspondingly modified connection of the control line 120 to the compressor 21.2. It is evident in detail A that the control line 120 connects directly to a connection valve 22 of the compressor chamber 21.3 of the compressor 21.2. The connection valve 22 to this extent takes over the functionality of the first check valve 122 shown in FIG. 1A and FIG. 2. In addition, in the present case, amongst other purposes to limit residual pressure, a further first check valve 23 is arranged in the pneumatic feed line 20 between the outlet valve 22.0 and the compressed air feed 1. This structure is shown enlarged in FIG. 3B. The result is a simplified embodiment in which the outlet valve 22.0 and/or connection valve 22 may be used in synergy so that, after automatic opening thereof to the control line 120, a suitable control pressure can be built up at the pressure control connection 71S of the purge valve 71.

FIG. 3A shows a first bypass line 123 with the purge choke 121 formed as a parallel line to the pneumatic feed line 20 of the air feed, wherein the pneumatic feed line 20 runs between the air feed connection 0 and the compressed air feed 1. The derived first bypass line 123 branches from a connection 20.1 of the pneumatic feed line 20, and leads to a connection 120.1 of the control line 120, bypassing the air compressor 21. In this case too, the outlet valve 22.0 performing the functionality of the check valve is to this extent formed as a statically open valve, i.e. a control pressure present at the pressure control connection 71S can, when operation of the compressor 21.2 has stopped, escape via the bypass line 123 and the purge choke 121 at the connection 20.1 of the air feed line 20, and from there to the air feed connection 0, and the control line 120 is purged accordingly.

Similarly, FIG. 3B—as shown in detail B—provides a further derived bypass line 123' which is formed as a bypass line to the outlet valve 22.0. Here the control line 120 can be purged of a control pressure—bypassing the outlet valve 22.0—via the bypass line 123' into the air compressor 21, e.g. into the compressor chamber 21.3 (bypass line 123' and purge choke 121' shown in dotted lines), or also into a part of the air feed line 20 after the air feed connection 0 and before the compressor chamber 21.3 (bypass line 123 and purge choke 121). In a derivative of both cases, the purge choke 121, 121' may in particular be formed as an integrated choke in the outlet valve 22.0 of the compressor 21.2. A pressure limitation may be implemented via the design of the area ratios, taking into account the purge choke 121, 121'. The pressure limitation here extracts a pressure via the pneumatic bypass line 123, 123' after the compressor 21.2—in concrete terms, between the outlet of the compressor chamber 21.3 and the compressed air feed 1—which is compensated via the choke 121, 121' if a threshold pressure is exceeded. At high pressures, the defined leakage via the choke 121, 121' prevents a further pressure rise in the bypass line 123, 123', and the sufficiently high dryer interior pressure can lift the valve piston of the pneumatic part 71P of the purge valve 71. Here, in all FIGS. 1A to 3A, a dryer interior pressure is indicated symbolically via the dryer interior pressure line 75, which always lies on the underside of the valve piston of the pneumatic part 71P of the purge valve 71 in the direction of the spring pressure of the valve spring of the purge valve 71.

Figure 4:
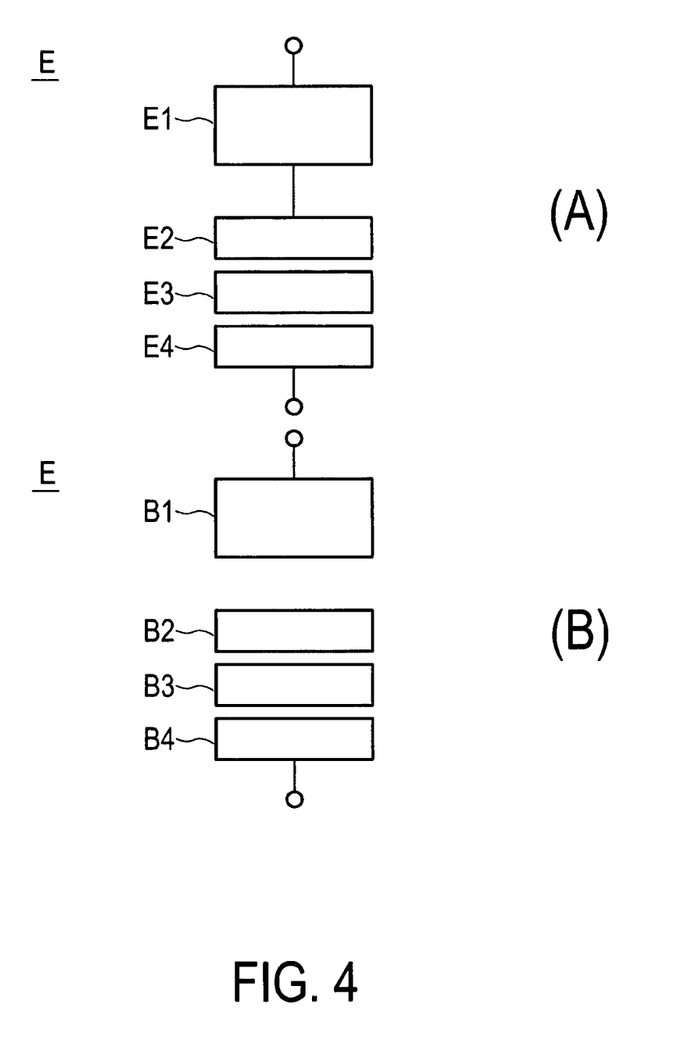
FIG. 4 diagrammatically in a flow diagram, the fundamental sequence of steps for purging a pneumatic installation or air dryer of a compressed air supply installation, for example that of FIG. 1A or FIG. 2 or FIG. 3A or FIG. 3B.

FIG. 4 shows diagrammatically, in a flow diagram E, the basic sequence of steps E1 to E4 for purging a pneumatic installation 90, 90', 90" or an air dryer 61. For this it is provided that in a first step E1, a compressor 21.2 of an air compressor 21 is stopped, i.e. is not in operation. Accordingly, in a second step E2, it is provided that a control line 120 via a purge choke 122 is statically open. If a control pressure is applied at a pressure control connection 71S of a purge valve 71 in the control line, this can be purged in the second step E2, past said first check valve 122. In a third step E3, accordingly the purge valve 71 is in a state not activated by control pressure and hence open between the pressure-side valve connection X and the purge-side valve connection Y. In a fourth step E4, by opening one of the bellows valves 93, a bellows 91—or by opening an accumulator valve 94, an accumulator 92—can be purged to a purge connection 3, in some cases with regeneration of the dryer 61.

View B of FIG. 4 shows a first flow diagram B for filling a pneumatic installation 90, 90', 90". In a first step B1, this provides the starting of a compressor 21.2 which compresses air in a compressor chamber 21.3. By opening an outlet valve 22.0 with the functionality of a check valve, or a connection valve 22 of the valve chamber 21.3, or a check valve 122 in a control line 120 to the pressure control connection 71S of the purge valve 71, in a second step B2 a control pressure can be built up to activate the purge valve 71. An outlet valve 22.0 or connection valve 22 of a compressor is here preferably still closed in the direction of a compressed air feed 1, i.e. a check valve 122 in a control line 120 opens before a pressure valve or outlet valve of the compressor, in order to first build up a control pressure. In a third step B3, the purge valve 71 closes, i.e. transfers from a non-actuated, open first switch position (as shown in FIG. 1A or FIG. 3A) into a pneumatically actuated, closed second switch position, in which the pressure-side valve connection X and the purge-side valve connection Y are pneumatically separated. In a fourth step B4, with the purge line 70 thus closed and the compressor still in operation, i.e. with a compressor pressure exceeding the actuation pressure (control pressure) of the purge valve 71—in particular with the outlet valve or pressure valve of the compressor opening—compressed air can be made available to the compressed air feed 1 and applied at the compressed air connection 2 via the air dryer 61 and the first choke 64 or via the automatically opening second check valve 122. Finally, via the compressed air connection 2, a gallery 95 of the pneumatic installation 90, 90', 90"—or if the bellows valve 93 is open, a corresponding bellows 91—can be filled with compressed air.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

0 Air feed connection
0.1 Air filter
0.3 Purge filter
1 Compressed air feed
2 Compressed air connection
3 Purge connection
10, 10', 10", 10G Compressed air supply installation
20 Pneumatic feed line
21 Air compressor
21.1 Motor
21.2 Compressor
21.3 Compressor chamber
22 Connection valve, in particular with check valve function, in control line 120
22.0 Outlet valve
23 Further check valve
40, 40', 40", 40"A, 40"B, 40G Valve assembly
60 Pneumatic main line
61 Air dryer
62 (Second) check valve in pneumatic main line 60
64 First choke
70 Purge line
71, 71G Purge valve
71P Pneumatic part
71S Pressure control connection on piston top side
71A Pressure counter-control connection on piston underside
72 Optional purge check valve
74 Second choke
75 Symbolic dryer interior pressure line
76 Valve spring of purge valve 71, 71G
90, 90' Pneumatic installation
91 Bellows
91L Bellows line as branch line
92 Accumulator
92L Accumulator line as branch line
93 Bellows valve as directional valve
94 Accumulator valve as directional valve
95 Gallery
96 Pneumatic line
98, 98', 98" Double valve block, quintuple valve block
100, 100', 100" Pneumatic system
102, 102' Pneumatic system
120, 120' Pneumatic control line, branch line
121, 121' Purge choke
122, 122G (First) check valve in control line 120
123, 123' First and further (second) bypass line
130 Minimum pressure valve assembly
132 Minimum pressure valve
133 Second bypass line
134 First choke
160 Counter-pressure control line
1000, 1000', 1000" Vehicle
A, B Detail
X Pressure-side valve connection
Y Purge-side valve connection

The invention claimed is:

1. A compressed air supply installation for operation of an air spring installation of a vehicle, the compressed air supply installation comprising:
an air feed with an air compressor configured to supply a compressed air feed with compressed air,
a pneumatic main line with an air dryer and a compressed air connection for supplying the pneumatic installation with compressed air,
a purge line branching from the pneumatic main line to the compressed air feed and comprising a purge valve connected in the purge line and a purge connection for releasing air to the environment, wherein the purge valve is part of a controllable valve assembly and includes a pressure control connection,
wherein the controllable valve assembly with the purge valve can be pneumatically loaded with a control pressure derived from the air compressor, and
wherein a pneumatic part of the purge valve has a valve piston which can be loaded with a control pressure which is present at the pressure control connection and derived from a control line connected directly to the air compressor.

2. The compressed air supply installation as claimed in claim 1, wherein in a non-pressurized state of the valve assembly, the purge valve is opened,
wherein an actuatable pneumatic part of the purge valve in a purge line is opened in the non-activated state of the purge valve between a pressure-side valve connection and a purge-side valve connection, so that in non-activated state of the purge valve, the purge valve is opened in order to connect the purge line through to the purge connection, and
wherein the purge valve can be activated pneumatically with a control pressure derived directly from the air compressor in order to shut off the purge line from the purge connection, and
wherein the control pressure is available in a control line directly between a compressor chamber of the air compressor and a pressure control connection against a pneumatic part of the purge valve.

3. The compressed air supply installation as claimed in claim 1, wherein a control pressure is available in a control line directly between a compressor chamber of the air compressor and a pressure control connection against a pneumatic part of the purge valve in the direction of a force of a valve spring, and/or
wherein a counter-control pressure is available in a counter-pressure control line between the pneumatic main line and a counter-pressure control connection against a pneumatic part of the purge valve and against the direction of a force of a valve spring.

4. The compressed air supply installation as claimed in claim 1, wherein a pneumatic part of the purge valve is formed as a 2/2-way directional valve, and the purge valve comprises a pressure control connection to which a control line is directly connected for guiding the control pressure.

5. The compressed air supply installation as claimed in claim 1, wherein the purge valve is configured for direct, pneumatically controlled switching of a compressed air volume of the purge line,
wherein the valve assembly comprises the purge valve in the purge line and a choke in a bypass line, and a counter-valve with check function connected in parallel to the bypass line,
wherein the counter-valve with check function comprises an outlet valve in a feed line and/or a connection valve in a control line and/or a check valve in a control line.

6. The compressed air supply installation as claimed in claim 1, wherein the air compressor comprises a single-stage or two-stage compressor with at least one compressor chamber,
wherein a control line is connected to a compressor chamber of the compressor indirectly via the compressed air feed or directly via an outlet valve and/or a connection valve.

7. The compressed air supply installation as claimed in claim 1,
wherein the valve assembly comprises, in addition to the purge valve, a check valve in the form of an outlet valve and/or a connection valve of the air compressor which is configured to, in the automatic opening direction, load the pressure control connection of the purge valve with control pressure.

8. The compressed air supply installation as claimed in claim 1, wherein a check valve of the valve assembly is arranged in the control line between a compressor chamber of the air compressor and a pressure control connection of the purge valve.

9. The compressed air supply installation as claimed in claim 1, wherein a compressor chamber of a compressor comprises a counter-valve with check function configured as an outlet valve and/or a connection valve
in a control line in addition to an outlet valve in a feed line, which is configured to perform the function of a check valve of the valve assembly.

10. The compressed air supply installation as claimed in claim 1, wherein a further check valve is arranged in a pneumatic feed line between a compressor chamber of a compressor and the compressed air connection, and configured to open automatically in the direction of the compressed air connection.

11. The compressed air supply installation as claimed in claim 1, wherein a control line without a check valve branches between a compressor chamber of a compressor and the further check valve.

12. The compressed air supply installation as claimed in claim 1, wherein in non-activated state of the valve assembly, the compressor can be operated to produce a control pressure for the pressure control connection, wherein the control pressure is sufficient for automatic opening of a check valve and/or an outlet valve and/or a connection valve configured as a check valve arranged in the control line and/or an outlet valve and/or a connection valve of the compressor.

13. The compressed air supply installation as claimed in claim 1, wherein a check valve and/or an outlet valve and/or a connection valve, configured as a check valve arranged in the control line and/or an outlet valve and/or a connection valve of the compressor, is formed statically open such that when the compressor is not in operation, the control line can be purged in the blocking direction of the check valve.

14. The compressed air supply installation as claimed in claim 1, wherein a purge choke is arranged in a bypass line bypassing a counter-valve with check function, through which line choke air can flow in the blocking direction of the counter-valve with check function bidirectionally.

15. The compressed air supply installation as claimed in claim 1, wherein a bypass line bypassing a check valve and/or an outlet valve is formed as a parallel line to the control line and connects to this on both sides, or as a branch line to the control line and connects to this on one side.

16. The compressed air supply installation as claimed in claim 1, wherein an at least one bypass line bypassing a check valve and/or an outlet valve is formed as a parallel line to a pneumatic feed line which runs between a compressor chamber of a compressor and the compressed air connection, and the bypass line connects to the feed line at least on one side,
wherein at least one bypass line is formed as a parallel line to a compressor chamber of a compressor connects to the feed line on both sides.

17. The compressed air supply installation as claimed in claim 1, wherein an at least one bypass line bypassing a check valve and/or an outlet valve is formed as a parallel line to an outlet valve of a compressor chamber of a compressor, and connects to a feed line on both sides.

18. The compressed air supply installation as claimed in claim 1, wherein a check valve and/or outlet valve is dynamically closed such that when the compressor is in operation, a control pressure is maintained, and even when air flows through the purge choke against the blocking direction of the check valve and/or outlet valve, is sufficient for automatic opening of a check valve against this blocking direction.

19. The compressed air supply installation as claimed in claim 1, further comprising:
a first choke, wherein the first choke is arranged directly in the pneumatic main line or a parallel line connected thereto between the air dryer and the compressed air connection, and/or
a second choke, wherein the second choke is arranged in the purge line or in a branch line directly connected to the purge line between the compressed air feed and the purge valve, and/or
a further choke in a bypass line and a counter-valve with check function connected parallel to the bypass line.

* * * * *